United States Patent [19]

Yamaguchi

[11] Patent Number: 4,986,637

[45] Date of Patent: Jan. 22, 1991

[54] ARRANGEMENT OF PICTURE ELEMENTS FOR COLOR DISPLAY

[75] Inventor: Hidefumi Yamaguchi, Fujisawa, Japan

[73] Assignee: International Business Machines Corporation, Armonk, N.Y.

[21] Appl. No.: 218,731

[22] Filed: Jul. 13, 1988

[30] Foreign Application Priority Data

Aug. 6, 1987 [JP] Japan .................. 62-195435

[51] Int. Cl.$^5$ .................. G02F 1/133; G09G 1/28
[52] U.S. Cl. .................. 350/339 F; 350/333; 340/702
[58] Field of Search .................. 350/339 F, 333; 340/702, 703, 784

[56] References Cited

U.S. PATENT DOCUMENTS

| | | | |
|---|---|---|---|
| 4,006,968 | 2/1977 | Ernstoff et al. | 350/339 F |
| 4,396,251 | 8/1983 | Mukoh et al. | 350/339 F |
| 4,600,274 | 7/1986 | Morozumi | 350/339 F |
| 4,791,415 | 12/1988 | Takahashi | 350/339 F |

FOREIGN PATENT DOCUMENTS

| | | | |
|---|---|---|---|
| 54-14119 | 2/1979 | Japan . | |
| 54-84997 | 7/1979 | Japan . | |
| 59-09636 | 1/1984 | Japan . | |
| 61-53684 | 3/1986 | Japan . | |
| 0070501 | 4/1986 | Japan | 350/339 F |

Primary Examiner—Stanley D. Miller
Assistant Examiner—Anita Pellman Gross
Attorney, Agent, or Firm—Bernard E. Shay; Robert M. Trepp

[57] ABSTRACT

A color display comprised of red, green and blue picture elements is described. The picture elements are arranged to provide a substantial improvement in the monochromatic line quality of the display. Individual elements of a particular color are arranged to form the vertices of substantially square patterns within the color display. Within each of the substantially square patterns formed by the elements of a single color (e.g., red), the colors not disposed at the vertices (e.g., blue and green) are disposed along a diagonal of the substantially square pattern. In this manner, a series of substantially square patterns of alternating red, green and blue picture elements sharing common diagonals are arranged to form a complete color display.

28 Claims, 7 Drawing Sheets

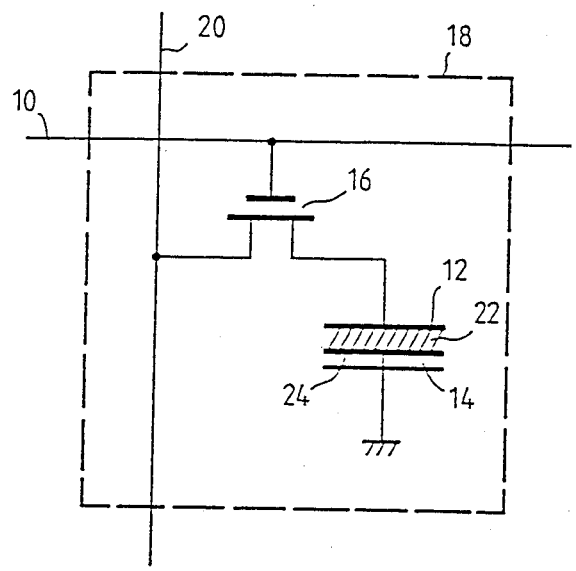
FIG. 5
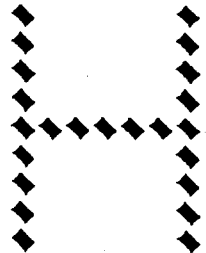  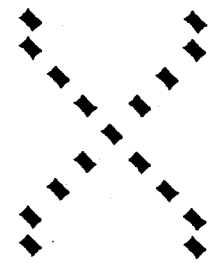
FIG. 6a    FIG. 6b

 
FIG. 12a  FIG. 12b
 
FIG. 13a  FIG. 13b
 
FIG. 14a  FIG. 14b

ARRANGEMENT OF PICTURE ELEMENTS FOR COLOR DISPLAY

This invention relates to color displays including picture elements of three different colors, which can be driven independently, and, in particular, to the arrangement of picture elements in a liquid crystal display using color filters

Background of the Invention

Heretofore, displaying colors has been performed by arranging picture elements of three different colors, i.e. red, green and blue picture elements on a display panel, and by controlling the light transmission or light emission of each picture element. More precisely, a display element consists of red, green and blue picture elements adjacent to each other. For example, when only the red picture element is in the light transmission (or emission) mode, red is displayed, and when only red and blue picture elements are in the light transmission (or emission) mode, purple is displayed.

There are various arrangements of the above red, green and blue picture elements FIG. 9 shows a color picture element array disclosed in FIG. 5 of Japanese Published Unexamined patent application Ser. No. 54-14119 published Feb. 2, 1979, (Japanese patent application Ser. No. 52-80324 filed July 5, 1977); and Japanese Published Unexamined patent application Ser. No. 54-84997 published July 6, 1979 (Japanese patent application Ser. No. 53-117884 filed Sep. 27, 1978). The element array illustrated in FIG. 9 consists of red picture element columns each of which has only red picture elements 102 arrayed vertically, green picture element columns each of which has only green picture elements 104 arrayed vertically, and blue picture element columns each of which has only blue picture elements 106 arrayed vertically, and these three picture element columns are horizontally arranged sequentially and recurrently.

FIG. 10 shows a color picture element array shown in FIG. 9 of Japanese Published Unexamined patent application Ser. No. 61-53684 published Mar. 17, 1986 (Japanese patent application Ser. No. 59-175703 filed Aug. 24, 1984). In this array, picture element columns (each of which consists of red, green and blue picture elements 202, 204 and 206 arrayed sequentially in the vertical direction) are shifted by the length of a picture element relative to the adjacent column and arranged horizontally, so that red, green and blue picture elements 202, 204 and 206 are continuously arrayed in the diagonal direction.

FIG. 11 shows a color picture element array disclosed in FIG. 1 of the above described Published Unexamined patent application Ser. No. 61-53684 and FIG. 2 of Japanese Published Unexamined patent application Ser. No. 59-9636 published Jan. 19, 1984 (Japanese patent application Ser. No. 57-118258 filed July 7, 1982). In this array, a first picture element column consisting of red, green and blue picture elements 302, 304 and 306 arrayed sequentially in the vertical direction, and a second picture element column consisting of red, green and blue picture elements shifted by the length of 1.5 picture elements in the vertical direction relative to picture elements of the same color in the first column, are alternately arranged in the horizontal direction.

When monochromatic displaying of red, green or blue is performed using the color picture element array according to the prior art shown in FIG. 9, although a vertical line is continuous as shown in FIG. 12, both a horizontal line (FIG. 12(a)) and an oblique line (FIG. 12(b)) become coarse broken lines. Also, if a large area is displayed as white (i.e., red, green and blue picture elements are all in the light transmission mode), vertical stripes are seen.

When monochromic displaying of red, green or blue is performed using the picture element array according to the prior art shown in FIG. 10, a vertical line becomes a set of oblique lines and a horizontal line becomes a broken line as shown in FIG. 13(a). Also, as FIG. 13(b) shows, an oblique line slanting to the left has a different display pattern from an oblique line slanting to the right.

When monochromic displaying of red, green or blue is performed using the picture element array according to the prior art shown in FIG. 11, although a horizontal line is denser than those using color picture element array of FIGS. 9 and 10, a vertical line is zigzag as shown in FIG. 14(a). Also, as FIG. 14(b) shows, an oblique line slanting to the left has a different display pattern from an oblique line slanting to the right.

This invention is intended to solve the problems in the prior art techniques described above. It is therefore an object of this invention to provide a color display by which almost the same display quality can be obtained for horizontal, vertical and oblique lines when color displaying is performed using any one of three picture elements of different colors, and no stripes are seen even when all the three picture elements of different colors are in the light transmitting or emitting mode.

Summary of the Invention

To achieve the above object, according to this invention, a first color picture elements, e.g. red picture elements, a second color picture elements, e.g. green picture elements, and a third color picture elements, e.g. blue picture elements are sequentially arranged in the directions of diagonals of first, second and third substantially square-shaped quadrangles, which coincide with each other, so that the first, second and third picture elements are respectively positioned at the vertices of the first, second and third quadrangles.

Brief Description of the Drawings

The novel features of the invention are set forth with particularity in the appended claims. The invention itself, however, both as to organization and method of operation, together with further objects and advantages thereof, may best be understood by reference to the following description taken in conjunction with the accompanying drawings in which:

FIG. 5 is a diagram of the equivalent circuit of a picture element in the color liquid crystal display which is constructed by the substrates shown in FIGS. 3 and 4.

FIG. 6(a) and FIG. 6(b) are pattern display diagrams showing character patterns produced when display is made by picture elements of a single color on a color display having the color element array shown in FIG. 1.

FIG. 12(a) and FIG. 12(b) are pattern display diagrams showing character patterns produced when display is made by picture elements of a single color on a color display having the color element array shown in FIG. 9.

FIG. 13(a) and FIG. 13(b) are pattern display diagrams showing character patterns produced when display is made by picture elements of a single color on a color display having the color element array shown in FIG. 10.

FIG. 14(a) and FIG. 14(b) are pattern display diagrams showing character patterns produced when display is made by picture elements of a single color on a color display having the color element array shown in FIG. 11.

Detailed Description of the Invention

Figure 1:
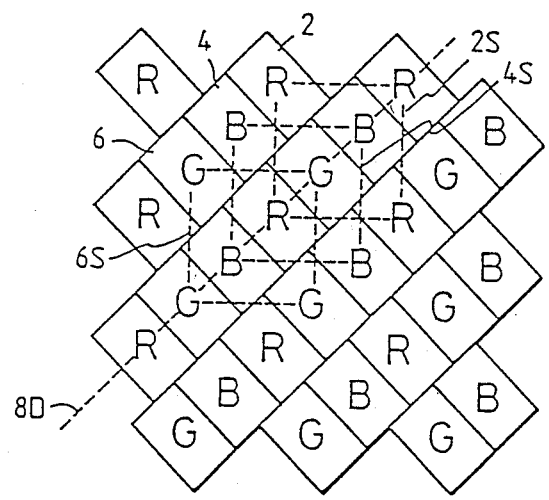
FIG. 1 is a schematic diagram showing an embodiment of color picture element array of a color display according to this invention.

FIG. 1 shows an embodiment of the color picture element array of a color display according to this invention. In this embodiment, red picture elements 2, green picture elements 4 and blue picture elements 6 are so arranged along the line 8D as to be positioned on the vertices of squares 2S, 4S and 6S, respectively. The squares 2S, 4S and 6S are of the same size, and the directions of their diagonals coincide with each other and with the direction of the line 8D. The line 8D extends in the direction of 45° from the horizontal direction.

As described above, since the red, green and blue picture elements 2, 4 and 6 are positioned on the vertices of the squares 2S, 4S and 6S of the same size, the distances in horizontal and vertical directions between the red pictures elements 2, between the green picture elements 4 and between the blue picture elements 6 are the same.

Figure 2:
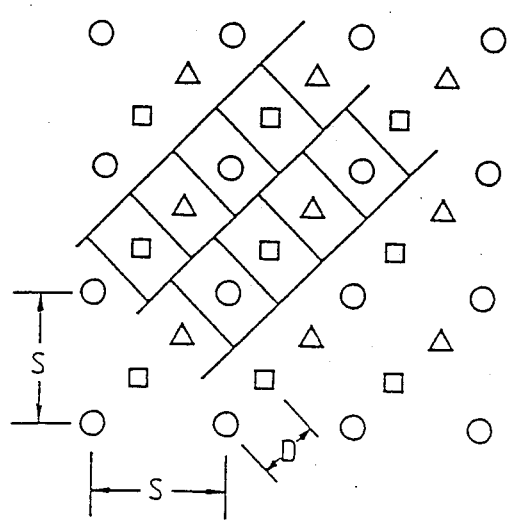
FIG. 2 is a diagram illustrating locational relationship between picture elements of the picture element array shown in FIG. 1.

FIG. 2 shows distances between centers of picture elements of the embodiment shown in FIG. 1. In FIG. 2, small circles, squares and triangles indicate the centers of the red, green and blue picture elements 2, 4 and 6, respectively. The relationship of the distance S in either the horizontal or vertical direction between (the centers of) picture elements of the same color with the distance D between (the centers of) picture elements of different colors which are adjacent to each other and arrayed in the direction of 45° from the horizontal direction is given by:

$$S:D = 3:\sqrt{3}$$

If all the picture elements are rectangular and of the same size, the two opposite sides of a picture element are in the direction of 45° from the horizontal direction, and the distance between a picture element arranged in a picture element array in the direction of 45° from the horizontal direction and a picture element of the same color on the adjacent picture element array is 1.5 picture elements.

If the ratio of the lengths of different sides of a rectangular picture element is 3:2, picture elements can be allocated to the whole screen without leaving vacant spaces.

Figure 3:
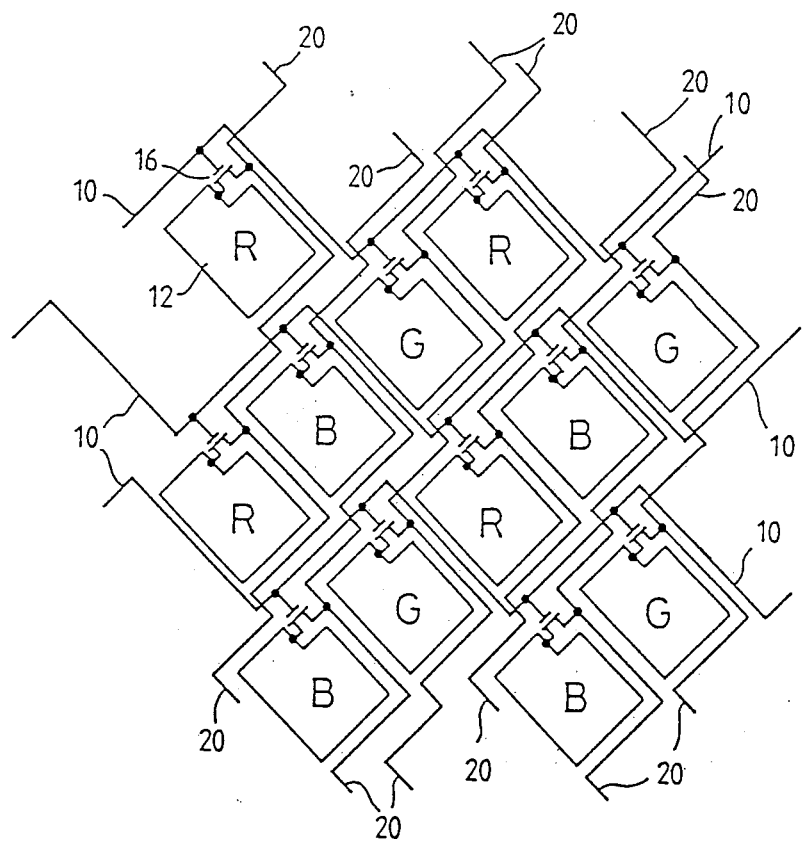
FIG. 3 is a schematic diagram showing a part of the thin film transistor substrate of a color liquid crystal display using the picture element array of FIG. 1.
Figure 4:
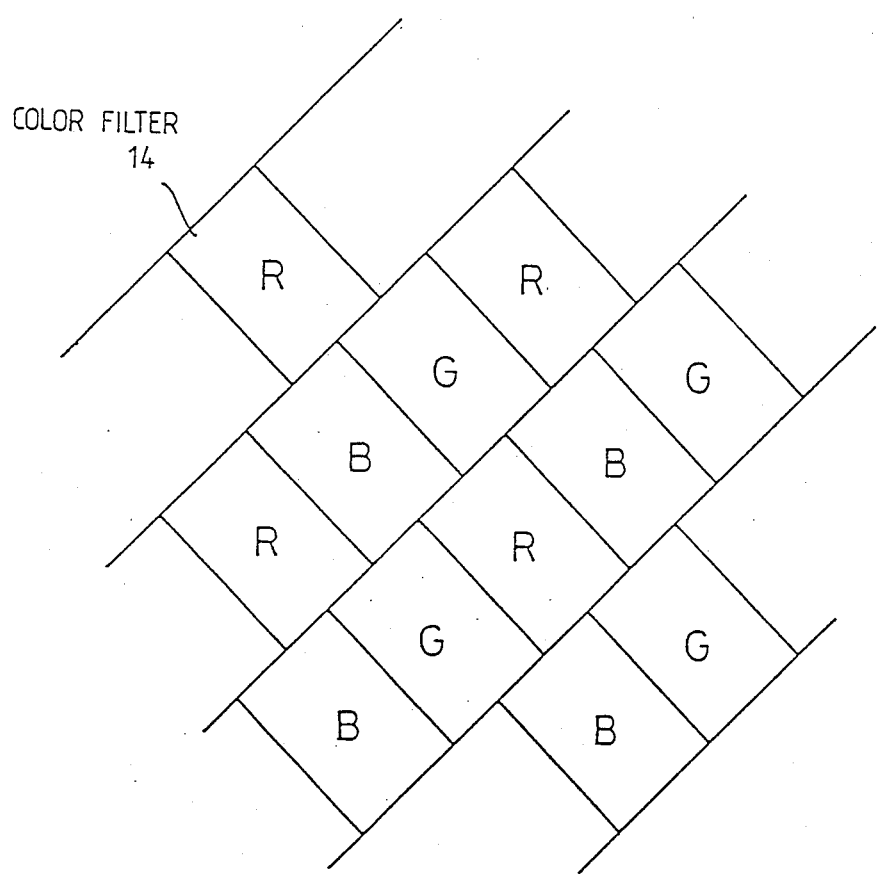
FIG. 4 is a schematic diagram showing a part of the color filter substrate provided facing to the thin film transistor substrate of FIG. 3.

FIG. 3 shows schematically a part of a substrate for thin film transistors when the picture element array of FIG. 1 is applied to a color liquid crystal display of a switching element lamination system. FIG. 4 shows a part of a color filter substrate provided in parallel to the thin film transistor substrate of FIG. 3 so as to cover the transistor substrate. A liquid crystal is filled between the thin film transistor substrate shown in FIG. 3 and the color filter substrate shown in FIG. 4. A transparent common electrode is formed which covers the color filter substrate entirely.

Continuing with reference to FIGS. 3 and 4, each picture element has a transparent picture element electrode 12; a color filter 14 facing the picture element electrode 12 across the liquid crystal; and a thin film (field effect) transistor 16 whose gate is connected to the gate line (scanning line) 10, whose drain is connected to the data line (signal line) 20, and whose source is connected to the transparent electrode 12. The color filter 14 includes a red filter which transmits only red light for a red picture element, a green filter which transmits only green light for a green picture element, and a blue filter which transmits only blue light for a blue picture element. In FIG. 4, R, G and B represent red, green and blue filters, respectively. The thin film transistor substrate and the color filter substrate are so constructed that each picture element electrode 12 is aligned with the corresponding color in filter 14. In FIG. 3, although a plurality of gate lines have the same reference number 10, and a plurality of data lines have the same reference number 20, each gate line 10 and data line 20 can be driven independently. Consequently, each picture element can be driven independently.

FIG. 5 shows an equivalent circuit of one picture element of the color liquid crystal display shown in FIGS. 3 and 4. In FIG. 5, the same reference numbers are given to the same components of FIGS. 3 and 4. In FIG. 5, the reference numbers 18, 22 and 24 designate a color picture element, a liquid crystal layer and a common transparent electrode respectively.

Next, the operation of the color liquid crystal display shown in FIGS. 3, 4 and 5 will be described. First, a data voltage is applied to each data line 20 separately, then a gate voltage is applied to the first gate line 10 to turn all the thin film transistors connected to this gate line on, and to place the liquid crystal layer 22 of each picture element in the light transmission or light shielding condition. Then, the voltage on the first gate line 10 is removed, and a data voltage is applied to each data line 20 separately and in the same manner as in the above case. A gate voltage is then applied to the second gate line 10. Even if the gate and data voltages are removed, the data voltage (accurately, the charge corresponding to the data voltage) is accumulated in the liquid crystal layer 22 with little attenuation, and the display such as a still picture can be obtained.

FIGS. 6(a) and 6(b) show "H" and "X" monochromatically displayed in red, green or blue by the color display using the color picture element array shown in FIG. 1, for example, represented by the color liquid crystal display shown in FIGS. 3, 4 and 5. As these figures show, the display quality of horizontal, vertical and oblique lines can be made almost the same.

Figure 7:
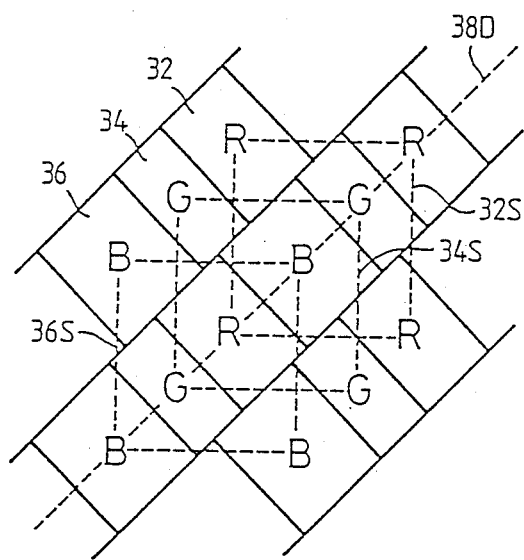
FIG. 7 is a schematic diagram showing another embodiment of color picture element array according to this invention.

Although the distance between (the centers of) picture elements of different colors arrayed in the direction of 45° from the horizontal direction is the same and the size of picture elements is also the same in the above embodiment, these are not necessarily the same. For example, as FIG. 7 shows, the area of the blue picture elements, which have low brightness, can be increased, and the area of the green picture elements, which have high brightness, can be decreased. (In this case, the distance between centers of green and blue picture elements 34 and 36 is increased, and the distance between centers of green and red picture elements 34 and 32 is decreased.) However, red, green and blue picture elements 32, 34 and 36 must be arranged in the direction of line 38D so that they are positioned on the vertices of the squares 32S, 34S and 36S whose diagonals are all in the direction of line 38D.

If three squares at the vertices of which red, green and blue picture elements are positioned are the same such as the squares 2S, 4S and 6S shown in FIG. 1 and the squares 32S, 34S and 36S shown in FIG. 7, the display quality of lines can be uniform regardless of colors even if characters or patterns on different locations are displayed as red, green or blue. In monochromatic display, however, since display is usually made in either one color of red, green or blue, the sizes of three squares at the vertices of which red, green and blue picture elements are positioned may be different from each other. That is, as long as picture elements of the same color are positioned at the vertices of squares, the distances between these color elements in horizontal and vertical directions are the same, and the distance in the diagonal direction is only $\sqrt{2}$ times the distance in horizontal and vertical directions. Therefore, display by the picture element of the same color is visually recognized to have horizontal, vertical and diagonal lines of the same quality.

The quadrangle at the vertices of which color picture elements are positioned does not need to be geometrically square. It is sufficient that first two sides in the horizontal direction are the same length and second two sides in the vertical direction are the same length and the first two sides and the second two sides are recognized to be perpendicular to the others.

Figure 8:
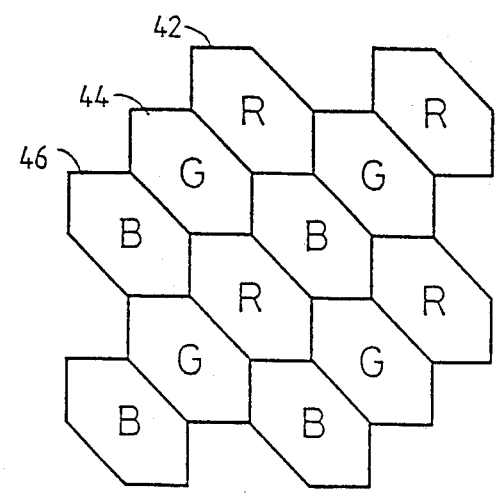
FIG. 8 is a schematic diagram showing still another embodiment of a color picture element array according to this invention.
Figure 9:
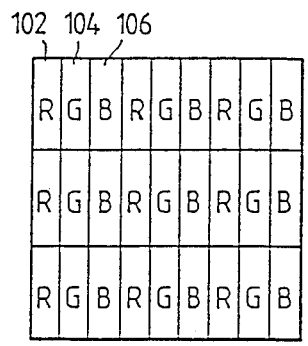
FIG. 9 is a schematic diagram showing a prior art color picture element array
Figure 10:
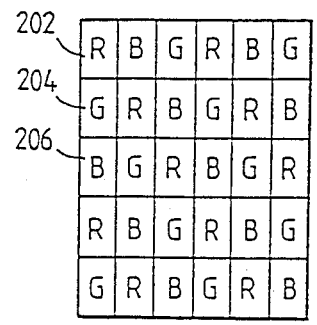
FIG. 10 is a schematic diagram showing another prior art color picture element array.
Figure 11:
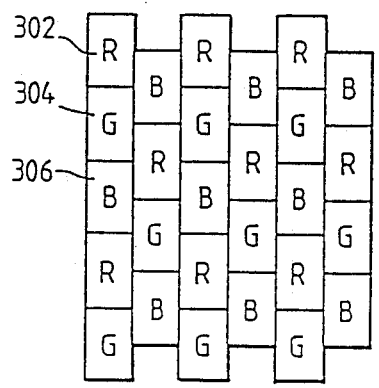
FIG. 11 is a schematic diagram showing still another prior art color picture element array.

Although it is preferable that the shape of picture elements is rectangular in view of the effective area of a picture element being large and of gate and data line wiring being easy, the shape is not limited to rectangular. Various other shapes may be used. For example, as shown in FIG. 8, red, green and blue picture elements 42, 44 and 46 may be hexagonal.

Although the embodiment shown in FIGS. 3, 4 and 5 relates to a liquid crystal display using linear (thin film transistor) switching elements, this invention can be applied to a liquid crystal display using non-linear switching elements such as thin film diodes.

Furthermore, this invention is not limited to liquid crystal displays. It can be applied to other color displays such as electrochromic displays. In summary, this invention can be applied to any type of displays having three types of picture elements of different colors. The colors of picture elements are not limited to red, green and blue.

As described above, according to this invention, since first, second and third color picture elements of different colors are arrayed in the directions of diagonals of first, second and third substantially square-shaped quadrangles, which coincide with each other, so that the first, second and third color picture elements of different colors are respectively positioned at the vertices of the first, second and third quadrangles, the distances between picture elements of the same color in horizontal and vertical directions and in the diagonal direction are substantially the same. Therefore, when display is made by the same color of either one of first, second and third color picture elements, the display quality of horizontal, vertical and oblique lines becomes almost uniform. Also, since the first, second and third color picture elements are uniformly dispersed, no stripes are seen even if all color picture elements of three different colors are in light transmitting or light emitting conditions.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What is claimed is:

1. A color display comprising:
   first, second and third color picture elements;
   means for driving each said picture element independently;
   wherein said first, second and third color picture elements are sequentially arrayed along the diagonals of first, second and third substantially square-shaped quadrangles;
   said picture elements including at least one side aligned substantially parallel to said diagonals; and
   said quadrangles coincide with each other, such that said first, second and third color picture elements are respectively positioned at the vertices of said first, second and third quadrangles.

2. A color display as claimed in claim 1, wherein:
   said display lies in a plane having a vertical axis and a horizontal axis perpendicular to said vertical axis; and
   the direction of said diagonals is approximately 45 degrees from the horizontal axis of said plane.

3. A color display as claimed in claim 2, wherein:
   the shapes of said first, second and third color picture elements are substantially identical.

4. A color display as claimed in claim 3, wherein:
   S is the distance between the centers of two adjacent picture elements of the same color along either said horizontal or said vertical axis of said plane;
   D is the distance between the centers of two adjoining picture elements of different colors sequentially and recurrently arrayed along said diagonal; and
   the ratio of said distance S to said distance D is $3:\sqrt{2}$.

5. A color display as claimed in claim 4, wherein:
   said first, second and third color picture elements are rectangular and two sides of said elements are substantially parallel to said diagonal.

6. A color display as claimed in claim 5, wherein:
   the lengths of the sides of said rectangles have a ratio of 3:2.

7. A color display as claimed in claim 6, wherein:

said first, second and third color picture elements are red, green and blue picture elements, respectively.

8. A color display as claimed in claim 7, wherein:
each of said first, second and third color picture elements includes a color filter of corresponding color.

9. A color display as claimed in claim 1, wherein:
the size of at least one of said first, second or third picture elements is different from the size of said other two picture elements.

10. A color display comprising:
color picture elements arranged on said display in a predetermined pattern;
means for driving each of said picture elements independently;
each of said picture elements being assigned to a first, second or third group;
said picture elements being arranged on said display such that the adjacent picture elements belonging to any one of said groups form a subgroup;
said picture elements including at least one side aligned substantially parallel to said diagonal; and
said picture elements being further arranged such that a subgroup of one of said groups forms a substantially square pattern with picture elements of a second and a third of said groups alternately arranged along a diagonal of said substantially square pattern.

11. A color display as claimed in claim 10, wherein:
the sides of said substantially square pattern define horizontal and vertical axes of said color display;
said horizontal axis being substantially perpendicular to said vertical axis; and
said diagonal being approximately 45° from said horizontal axis.

12. A color display as claimed in claim 10, wherein:
said substantially square patterns of said subgroups are arranged such that said patterns which are coincident share a common diagonal.

13. A color display as claimed in claim 12, wherein:
the shapes of said color picture elements are substantially identical.

14. A color display as claimed in claim 13, wherein:
S is the distance between the centers of two adjacent picture elements of the same group along either said horizontal or said vertical axis of said color display;
D is the distance between the centers of two adjoining picture elements of different groups sequentially and recurrently arrayed along said diagonal; and
the ratio of said distance S to said distance D is $3:\sqrt{2}$.

15. A color display as claimed in claim 14, wherein:
said color picture elements are rectangular; and
two sides of said elements are substantially parallel to said diagonal.

16. A color display as claimed in claim 15, wherein:
the lengths of the sides of said color picture elements have a ratio of 3:2.

17. A color display as claimed in claim 16, wherein:
said first, second and third groups are comprised of red, green and blue picture elements, respectively.

18. A color display as claimed in claim 17, wherein:
each of said picture elements of said first, second and third group includes a color filter of corresponding color.

19. A color display as claimed in claim 12, wherein:
the size of said picture elements of at least one of said first, second or third group is different from the size of said picture elements of said other two groups.

20. A color display, comprising:
picture elements arranged on said display in a predetermined pattern;
means for driving each of said picture elements independently;
each of said picture elements being assigned to a first, second or third group;
said display being divisible into subgroups of said picture elements;
each of said subgroups including four of said picture elements of said first group, said four elements of said first group forming the vertices of a square;
said picture elements including at least one side aligned substantially parallel to said diagonal; and
each of said subgroups further including one element of said second and said third groups alternately arranged along a diagonal of said square.

21. A color display as claimed in claim 20, wherein:
the sides of said square define horizontal and vertical axes of said color display;
said horizontal axis being substantially perpendicular to said vertical axis; and
said diagonal being approximately 45° from said horizontal axis.

22. A color display as claimed in claim 21, wherein:
the shapes of said picture elements are substantially identical.

23. A color display as claimed in claim 22, wherein:
S is the distance between the centers of two adjacent picture elements of the same group along either said horizontal or said vertical axis of said plane;
D is the distance between the centers of two adjoining picture elements of different groups sequentially and recurrently arrayed along said diagonal; and
the ratio of said distance S to said distance D is $3:\sqrt{2}$.

24. A color display as claimed in claim 23, wherein:
said picture elements are rectangular and two sides of said elements are substantially parallel to said diagonal.

25. A color display as claimed in claim 24, wherein:
the lengths of the sides of said rectangles have a ratio of 3:2.

26. A color display as claimed in claim 25, wherein:
said picture elements of said first, second and third groups are red, green and blue picture elements, respectively.

27. A color display as claimed in claim 26, wherein:
each of said color picture elements includes a color filter of corresponding color.

28. A color display as claimed in claim 21, wherein:
the size of at least one of said first, second or third picture elements is different from the size of said other two picture elements.

* * * * *